United States Patent Office 3,371,256
Patented Feb. 27, 1968

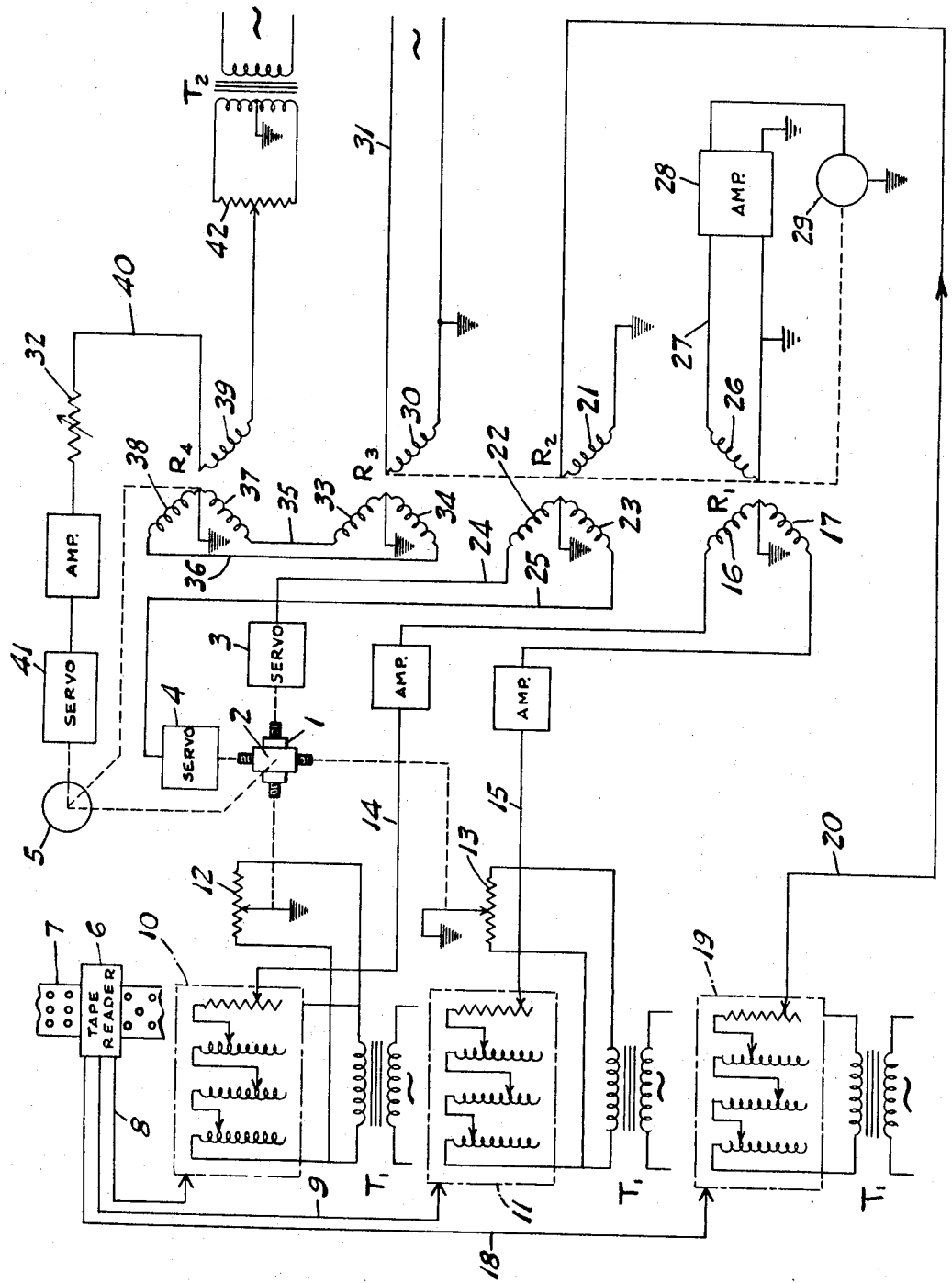

3,371,256
MACHINE CONTROL SYSTEM INCLUDING CONTROL IN TWO DIRECTIONS AND ABOUT A THIRD AXIS
Robert H. Eisengrein, Skaneatales, and Francis O. Blackwell III, Seneca Falls, N.Y., assignors to Seneca Falls Machine Company, Seneca Falls, N.Y.
Continuation-in-part of application Ser. No. 374,759, June 12, 1964. This application Dec. 7, 1964, Ser. No. 416,411
7 Claims. (Cl. 318—18)

This application is a continuation-in-part of our pending application Ser. No. 374,759, filed June 12, 1964. This invention relates generally to the control art, and more specifically to a new and useful numerical control system for machines of various kinds.

In our above identified pending application there is disclosed a machine control system which is operable to maintain a predetermined angular orientation of a supporting part relative to the path being followed. The supporting part can carry, for example, a cutting tool block, a winding mechanism, or other work performing means, and the system is operable to maintain a predetermined orientation thereof relative to the path being traversed. The system is operable from various inputs including for example both template tracing and tape reading arrangements.

The aforesaid system utilizes a speed direction resolver to generate a signal corresponding to the direction from the supporting part to a desired position thereof along its path of travel, and an index resolver coupled to the part for positioning in accordance with the position of the part about the index axis. The two resolvers are compared to provide a signal corresponding to the displacement of the support part from a desired position thereof about the index axis, and a drive motor responsive to such displacement signal indexes the supporting part.

A problem can arise where the rate of feed is variable, because in comparing the feed and index resolvers the varying feed rate can influence the index servo loop and this can be undesirable.

Accordingly, a primary object of our invention is to provide a control system of the type disclosed in our aforesaid application wherein the index servo loop has a constant gain and does not vary with the feed rate.

In one aspect thereof, a machine control system constructed in accordance with the instant invention is characterized by the provision of a machine part movable along one axis and about another axis, means defining a desired position of the part along the one axis, means including a resolver generating a rate of feed signal corresponding to the direction from the part to the desired position along the one axis, drive means responsive to the direction signal, direction correcting means arranged in controlling relation to the feed direction resolver, an index resolver coupled to the part for positioning in accordance with the position thereof about the other axis, means comparing the resolvers independently of the rate of feed of the part along the one axis and generating a signal corresponding to the displacement of the part from a desired position thereof about the other axis, and indexing drive means responsive to the last-named signal.

The foregoing and other objects, advantages and characterizing features of our invention will become clearly apparent from the ensuing detailed description of an illustrative embodiment thereof, reference being made to the accompanying drawing depicting the same wherein the single figure is a schematic representation of an illustrative machine control system of our invention.

Referring now in detail to the illustrative embodiment of our invention as depicted in the accompanying drawing, there is shown a machine having a carriage 1 movable along one axis, referred to as the X axis, and a slide 2 carried by carriage 1 for movement therewith along the X axis, the slide also being movable relative to carriage 1 along another, right angularly related axis, referred to as the Y axis. Carriage 1 and slide 2 are adapted to be driven along their respective axes by servomotor drives 3 and 4, respectively, which can be of any suitable type providing an output speed proportional to input voltage, such as that disclosed and described in detail in our pending application Serial No. 285,683, filed June 5, 1963.

A tool support or other machine part, shown in the form of a head 5 is mounted on slide 2 for movement therewith, and for indexing movement relative thereto in opposite directions about another axis, for example a vertical axis normal to the plane defined by the X and Y axes. The X and Y axes are referred to as the feed axes, while the axis about which head 5 is indexed is called the index axis.

A tape reading mechanism 6 of conventional design is adapted to read information carried by a tape 7, which can be a standard eight channel tape. The X and Y axis positioning information carried by tape 7 is transferred from reading mechanism 6 via leads 8 and 9 to groups of high speed relay storage modules 10 and 11, respectively. The module groups 10, 11 are of a known type, per se, comprising in the illustrated embodiment a series of voltage dividing inductance and resistance devices.

Relay groups 10 and 11 convert the digital target position information from tape 7 into analog information, with group 10 defining in voltage terms the desired position of carriage 1 along the X axis, and with group 11 defining in voltage terms the desired position of slide 2 along the Y axis. The desired positions along the respective axes define a target position, toward which the members 1, 2 and 5 are driven.

Relay groups 10 and 11 are combined into balance bridge arrangements with adjustable potentiometers 12 and 13, respectively, which latter are coupled to carriage 1 and slide 2, respectively for adjustment in accordance with the actual position thereof along their respective axes. The balance bridges are energized from suitable sources through transformers T1.

As described in greater detail in our pending application Serial No. 212,769, filed July 26, 1962, to which reference is hereby made for further details, if the actual position of carriage 1 along the X axis does not correspond to the X axis component of the target position, the bridge 10, 12 is unbalanced, producing an output signal corresponding in amplitude to the magnitude of displacement along the X axis, and in phase to the direction of such displacement. The same is true with respect to bridge 11, 13 and the Y axis. The displacement signals along the X and Y axes are transmitted via leads 14 and 15, respectively, to the quadrature stator windings 16, 17, respectively, of an angle computing resolver R1. The displacement signals are combined by resolver windings 16, 17 to produce a resulting field having an angle determined by the straight line direction from the actual position of carriage 1 and slide 2 to the desired, target position thereof.

The rate of feed of servomotors 3 and 4 also is contained on tape 7, in digital form, the rate of feed information being transferred from the reading mechanism 6 via lead 18 to a high speed relay storage module 19 of the same type as modules 10 and 11. Relay module 19 is energized from a suitable source through transformer T1, and converts the digital information on tape 7 to a rate of feed voltage signal which is transmitted via lead 20 to the rotor winding 21 of a second resolver R2. The signal in armature winding 21 of the speed direction resolver R2 is resolved by the quadrature stator windings 22, 23 thereof into its X axis and Y axis components, respectively. These signal components are transmitted via leads 24 and 25 to the X and Y axis servo drives 3 and 4.

Resolver R2 is controlled by resolver R1, to cause the direction of movement of carriage 1 and slide 2 to coincide with the target direction as computed by resolver R1, as follows. If the angular position of armature winding 26 of resolver R1 does not coincide with the resultant field angle thereof, an error signal is produced across winding 26. This error signal is transmitted via lead 27 and amplifier 28 to a zeroing servomotor 29. The error signal has a magnitude corresponding to the angular displacement of winding 26 from the field angle determined by windings 16 and 17, and a polarity corresponding to the direction of such displacement. Motor 29 is coupled to the rotor armature winding 26, by a mechanical connection, and turns winding 26 until it coincides with the resultant field angle of resolver R1, whereupon no further signal is produced in winding 26 and motor 29 stops.

This zeroing alinement is substantially instantaneous. Also, the armature, rotor winding 21 of resolver R2 is coupled, by a mechanical connection to the winding 26 of resolver R1. Therefore, winding 21 also will be turned by motor 29 into a position at right angles to the alined position of winding 26, to define a speed direction corresponding to the direction of movement from the actual position of the parts to the target or desired position.

Head 5, carried by slide 2, is indexed to a predetermined angle, for example normal to the direction of movement of carriage 1 and slide 2, and this is accomplished independently of the variations in the rate of feed, as follows. An index rate resolver R3 has an armature, rotor winding 30 coupled, through a mechanical connection, to windings 21 and 26 of resolvers R2 and R1, respectively. Therefore, the winding 30 of resolver R3 also is positioned by the zeroing servomotor 29. An excitation signal is transmitted from a suitable alternating source, not shown, via lead 31 to armature winding 30. This signal is resolved by the quadrature stator windings 33 and 34 of the resolver R3 into X and Y axis components, respectively, and these components are transmitted via leads 35 and 36 to the quadrature rotor field windings 37 and 38, respectively, of indexing resolver R4. Rotor winding 30 of resolver R3 is positioned at right angles to rotor winding 26 of resolver R1, whereby windings 33 and 34 define a position at right angles to the speed direction of part 5. The windings 37 and 38 of resolver R4 are coupled to head 5 for positioning in accordance with the position of head 5 about the index axis, and through the connection between windings 37, 38 and 33, 34 the positions of resolvers R3 and R4 are compared.

If head 5 is not at the desired position as defined in resolver R3, there will be produced in the winding 39 of resolver R4 an error signal which is transmitted via lead 40 and a stability control adjustable potentiometer 32 to a servomotor drive 41. Servo 41 can be of the same type as servo drives 3 and 4, and will position head 5 about the index axis in accordance with the error signal which has a magnitude equal to the extent of angular displacement, and a polarity equal to the direction thereof.

Thus, a predetermined orientation of head part 5 is maintained relative to the feed direction, without interference from the rate of feed signal. The mechanical connection between resolvers R2 and R3 maintains the rate of feed and index control circuits electrically independent.

If desired, instead of positioning head 5 normal to the direction of movement thereof along the X and Y axes, it can be angularly offset by biasing the output signal from resolver R4. The biasing network includes a transformer T2 energized from a suitable source, not shown, and an adjustable potentiometer 42 across the center tapped, secondary transformer T2. Potentiometer 42 is connected in series with winding 39, and by varying the adjustment of potentiometer 42 a positive or negative bias is introduced, resulting in a corresponding angular offset of head 5 to one side or the other of the perpendicular position thereof as defined by resolvers R1 and R4.

Accordingly, it is seen that our invention fully accomplishes its intended objects. The indexing resolver R4 is compared to the speed direction resolver R2 under control of the zeroing servomotor 29, but in a manner maintaining the gain of the index servo loop independent of variations in the rate of feed. While we have disclosed and described in detail only one embodiment of our invention, that has been done by way of illustration, without thought of limitation. For example, our invention can be used with inputs other than tape, such as mechanical and optical tracers.

Having fully disclosed and completely described our invention, and its mode of operation, what we claim as new is:

1. A machine control system comprising a machine part movable along first and second axes and about a third axis, means defining a desired position of said part along said first and second axes, means generating first and second signals corresponding to the displacement of said part from said desired position thereof along said first and second axes, first resolver means resolving said first and second signals into the direction from said part to said desired position, means generating a third signal corresponding to the rate of feed of said part along said first and second axes, second resolver means resolving said third signal into components corresponding to said first and second axes, means responsive to said third signal components for driving said part along said first and second axes, direction correcting means responsive to said first resolver means and arranged in controlling relation to said second resolver means, index resolver means coupled to said part for positioning in accordance with the position thereof about said third axis, means comparing said index and second resolver means independently of variations in said third signal and generating a fifth signal corresponding to the displacement of said part from a desired position thereof about said third axis, and drive means responsive to said fifth signal for indexing said part about said third axis.

2. A machine control system comprising a machine part movable along first and second axes and about a third axis, means defining a desired position of said part along said first and second axes, means generating first and second signals corresponding to the displacement of said part from said desired position thereof along said first and second axes, first resolver means resolving said first and second signals into the direction from said part to said desired position, means generating a third signal corresponding to the rate of feed of said part along said first and second axes, second resolver means resolving said third signal into components corresponding to said first and second axes, means responsive to said third signal components for driving said part along said first and second axes, third resolver means resolving a fourth signal into components corresponding to said first and second axes, direction correcting means responsive to said first resolver means and arranged in controlling relation to said second and third resolver means, fourth resolver means coupled to said part for positioning in accordance with the position of said part about said third axis, means comparing said third and fourth resolver means and generating a fifth signal corresponding to the displacement of said part from a desired position thereof about said third axis, and means responsive to said fifth signal for indexing said part about said third axis.

3. A machine control system comprising a machine part movable along first and second axes and about a third axis, means defining a target position for said part along said first and second axes, means generating first and second signals corresponding to the displacement of said part from said target position thereof along said first and second axes, first resolver means resolving said first and second signals into the direction from said part to said target position, means generating a third signal corresponding to the rate of feed of said part along said first and second axes, second resolver means resolving said third signal into components corresponding to said first and second axes, means responsive to said third signal components for driving said part along said first and second axis, third resolver means resolving a fourth signal into components corresponding to said first and second axes, direction correcting means arranged in controlling relation to said second and third resolver means, fourth resolver means coupled to said part for positioning in accordance with the position thereof about said third axis, means comparing said third and fourth resolver means and generating a fifth signal corresponding to the displacement of said support from a desired position thereof about said third axis, and drive means responsive to said fifth signal for indexing said part about said third axis.

4. A machine control system comprising a machine part movable along first and second axes and about a third axis, means defining a desired position of said part along said first and second axes, means generating first and second signals corresponding to the displacement of said part from said desired position thereof along said first and second axes, first resolver means resolving said first and second signals into the direction from said part to said desired position, means generating a third signal corresponding to the rate of feed of said part along said first and second axes, second resolver means resolving said third signal into components corresponding to said first and second axes, means responsive to said third signal components for driving said part along said first and second axes, third resolver means resolving a fourth signal into components corresponding to said first and second axes, direction correcting means responsive to said first resolver means and arranged in controlling relation to said second and third resolver means, fourth resolver means coupled to said part for positioning in accordance with the position thereof about said third axis, means comparing said third and fourth resolver means and generating a fifth signal corresponding to the displacement of said part from a desired position thereof about said third axis, drive means responsive to said fifth signal for indexing said part about said third axis, and means for biasing said fifth signal for selective offset positioning of said part about said third axis.

5. A machine control system comprising a machine part movable along first and second axes and about a third axis, means defining a desired position of said part along said first and second axes, means generating a signal corresponding to the rate of feed of said part along said first and second axes, speed direction resolver means resolving said signal into components corresponding to said first and second axes, means responsive to said signal components for driving said part along said first and second axes, second resolver means resolving a second signal into components corresponding to said first and second axes, direction correcting means arranged in controlling relation to said speed direction and second resolver means, index resolver means coupled to said part for positioning in accordance with the position thereof about said third axis, means comparing said second and index resolver means and generating a signal corresponding to the displacement of said part from a desired position thereof about said third axis, and drive means responsive to said displacement signal for indexing said part about said third axis.

6. A machine control system comprising a machine part movable along first and second axes and about a third axis, means defining a desired position of said part along said first and second axes, means generating a signal corresponding to the rate of feed of said part along said first and second axes, speed direction resolver means resolving said rate of feed signal into components corresponding to said first and second axes, means responsive to said third signal components for driving said part along said first and second axes, direction correcting means arranged in controlling relation to said speed direction resolver means, index resolver means coupled to said part for positioning in accordance with the position thereof about said third axis, means comparing said index and speed direction resolver means independently of variations in said rate of feed signal and generating a signal corresponding to the displacement of said part from a desired position thereof about said third axis, and drive means responsive to said last-named signal for indexing said part about said third axis.

7. A machine control system as set forth in claim 6, wherein said index and speed direction resolver comparing means includes another resolver having a rotor mechanically coupled to the rotor of said speed direction resolver for positioning in accordance therewith, said other resolver having quadrature field windings electrically connected to quadrature field windings in said index resolver for producing a corresponding field angle in said index resolver.

No references cited.

ORIS L. RADER, *Primary Examiner.*

G. SIMMONS, *Assistant Examiner.*